United States Patent

Thunstrom

Patent Number: 5,571,491
Date of Patent: Nov. 5, 1996

[54] PURIFYING APPARATUS

[75] Inventor: Alf Thunström, Södertälje, Sweden

[73] Assignee: Modo-Chemetics AB, Örnsköldsvik, Sweden

[21] Appl. No.: 256,097

[22] PCT Filed: Dec. 18, 1992

[86] PCT No.: PCT/SE92/00883

§ 371 Date: Sep. 2, 1994

§ 102(e) Date: Sep. 2, 1994

[87] PCT Pub. No.: WO93/11857

PCT Pub. Date: Jun. 24, 1993

[30] Foreign Application Priority Data

Dec. 19, 1991 [SE] Sweden ............... 9103777

[51] Int. Cl.$^6$ .................. B01J 8/00; B01J 8/02
[52] U.S. Cl. ............ 423/245.3; 422/171; 422/180
[58] Field of Search ............... 422/171, 180; 423/245.3

[56] References Cited

U.S. PATENT DOCUMENTS

| 2,946,651 | 7/1960 | Houdry | 422/171 |
| 3,361,531 | 1/1968 | Erb et al. | 423/219 |
| 3,870,474 | 3/1975 | Houston | 422/171 |

FOREIGN PATENT DOCUMENTS

| 0337143 | 10/1989 | European Pat. Off. | |
| 1011950 | 4/1984 | U.S.S.R. | 423/245.3 |
| 2065629 | 7/1981 | United Kingdom | 423/245.3 |

*Primary Examiner*—Wayne Langel
*Attorney, Agent, or Firm*—John Lezdey & Associates

[57] ABSTRACT

This invention relates to a method of purifying gases which are polluted by hydrocarbons and the like in an apparatus having two reactors. Each reactor contains a catalyst bed, a ceramic bed and a border layer located between the two beds. The polluted gas is forced to stream alternately through the first reactor and the second reactor (clock-wise streaming) and the second reactor and the first reactor, respectively (counter clock-wise streaming). The purification of said gas occurs when the hydrocarbons in the gas are oxidized to carbon dioxide and water in the catalyst beds. The temperature of the gas streaming through the upper portion of the reactors is measured. When the temperature exceeds a certain level, a portion of the gas is taken out from the apparatus during the passage over the border layer of the second reactor if said gas is streaming in a clock-wise direction, and a portion of said gas is taken out from the apparatus during the passage over the border layer of the first reactor if said gas is streaming in a counter clock-wise direction.

5 Claims, 1 Drawing Sheet

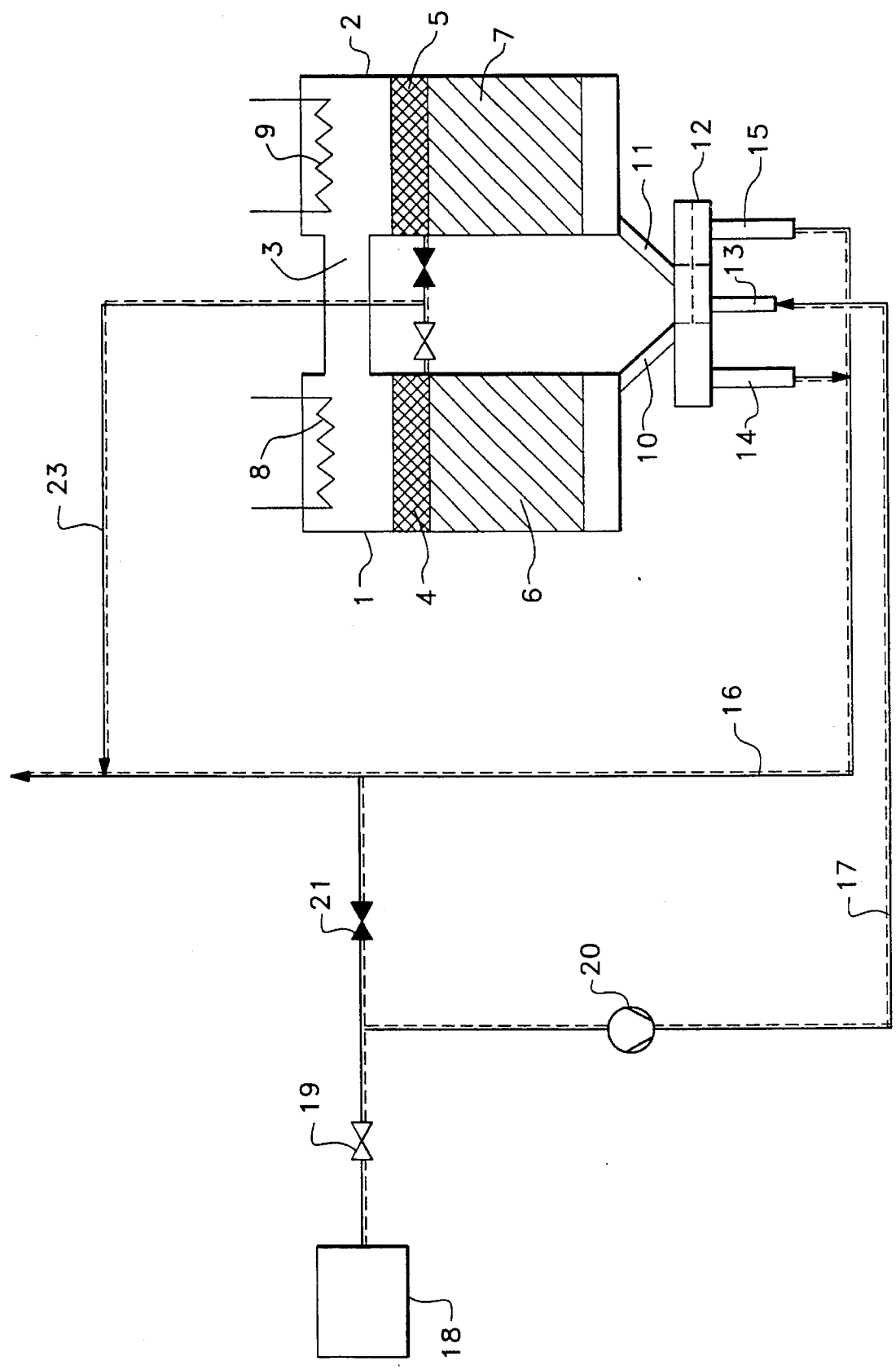

PURIFYING APPARATUS

BACKGROUND OF THE INVENTION

1. Field of the Invention

This invention related to a method of purifying gases which are polluted by hydrocarbons and the like. The invention also relates to an apparatus which is usable for carrying out the method.

2. Description of the Prior Art

Authorities and the public have lately strongly increased the demands for a reduction of outlets of substances polluting the environment. Such substances can be hydrocarbons in solvents which are admixed to the ventilation air from an industrial plant.

There is today in the market an apparatus for purifying gases, for instance ventilation air having an admixture of hydrocarbons, the purification being made by catalytic combustion so that the hydrocarbons damaging for the environment are transformed to carbon dioxide and water. This apparatus comprises two reactors, each of which having a catalyst bed and a ceramic bed. The combustion reaction is exothermic, i.e. it emits heat. If the concentration of pollutions, i.e. in this case the content of hydrocarbons, is high enough, the combustion process becomes self-supporting, which means that no external energy needs to be supplied.

Heat emitted during the combustion reaction increases as the content of pollutions increases in the gas that shall be purified. This means that the temperature in the purification apparatus can be so high that the material is damaged. Owing to that the apparatus known in the market has limitations regarding the possibility to manage purification of gases having high contents of pollutions.

According to known technique there has been an attempt to solve this problem by making possible to take out gas to atmosphere at an area between the two reactors (see for instance EP-337 143). In order that this shall be acceptable from an environmental point of view, however, such a channel going out to the atmosphere has to be provided with a separate catalyst. This solution is of course both complicated and expensive.

This invention intends to offer a solution of the problem of purifying gases having high contents of pollutions, which solution is uncomplicated, relatively spoken, and attractive from an expenditural point of view. This has been made possible by a method of the kind mentioned by way of introduction, which is characterized by the moments mentioned in the claims.

SUMMARY OF THE INVENTION

This invention relates to a method of and apparatus for purifying gases which are polluted by hydrocarbons and the like. The apparatus has two reactors, each reactor comprising a catalyst bed, a ceramic bed and a border layer lying between the two beds. According to the invention, the gas that shall be purified is forced to stream alternately through the first reactor and the second reactor (clock-wise streaming) and the second reactor and the first reactor, respectively (counter clock-wise streaming). The gas is purified when the hydrocarbons in the gas are oxidized to carbon dioxide and water in the catalyst beds. The temperature of the gas streaming through the upper portion of the reactors is measured and when the temperature exceeds a certain level, a portion of the gas is taken out from the apparatus during the passage over the border layer of the second reactor if the gas is streaming in a clock-wise direction, and a portion of the gas is taken out from the apparatus during the passage over the border layer of the first reactor if the gas is streaming in a counter clock-wise direction.

A preferred embodiment of an apparatus according to the invention, useable for carrying out the method shall be described more closely below with reference to the accompanying drawing.

BRIEF DESCRIPTION OF THE DRAWINGS

FIG. 1 illustrates a schematic of the dual reactor embodiment.

DESCRIPTION OF THE PREFERRED EMBODIMENTS

Referring to the drawing is shown there the new apparatus. This one comprises two reactors 1, 2 which are placed at a distance from each other and are preferably cylindrical. The two reactors 1, 2, which are preferably vertically arranged, are at their upper portions connected by a pipe means 3. Each reactor 1, 2 has a catalyst bed 4, 5 and a ceramic bed 6, 7. The catalyst beds are intended to function as purification means for the gas, whereas the ceramic beds are intended to function as heat storage means. Furthermore, each catalyst bed 4, 5 is placed on the top of the ceramic bed 6, 7. An electric heater 8, 9 is arranged in the upper portion of each reactor 1, 2. External, electric energy by these two electric heaters can be supplied to the gas which is intended to stream through the reactors. Of course, it is possible to use a gas burner instead of electric heaters for heating the gas. The lower portion of each reactor 1, 2 is connected by a pipe means 10, 11 with an exchange valve 12, by means of which it is possible to control the instreaming gas flow so that it first passes the first reactor 1 and then the second one 2, alternately, first the second reactor 2 and then the first one 1. Due to that fact the ceramic beds 6, 7 alternately function as heat absorbers and heat emitters.

The exchange valve 12 has an entrance 13 for polluted gas and two exits 14, 15 for purified gas. The exchange valve 12, however, is so designed that when the one exit 14 is open, is the other exit 15 closed and vice versa. The two exits 14, 15 are connected to one and the same conduit 16 which leads the purified gas out to the atmosphere.

The entrance 13 of the exchange valve 12 is connected with a conduit 17 which is intended to lead the polluted gas from an emission source 18 via a shut-off valve 19 and a fan means 20 to the exchange valve 12 and further into the reactors 1, 2. Between the conduits 16, 17 there is a arranged a bypass-valve 21.

The apparatus further has a conduit 22 connecting the two reactors 1, 2 with each other. This conduit 22 is connected to each reactor 1, 2 approximately at the transition area between the catalyst bed 4, 5 and the ceramic bed 6, 7. The conduit 22 is connected with the conduit 16 to the atmosphere by a further connection conduit 23. Due to that fact there is created a conduit portion 22a connecting the one reactor 1 with the connection conduit 23 to the atmosphere and a conduit portion 22b connecting the other reactor 2 with the connection conduit 23. In each of these two conduit portions 22a, b is a shut-off valve 24, 25 arranged. These valves are so arranged that when one 24 is open, is the other one 25 closed and vice versa. According to the preferred embodiment shown in the drawing the conduit 22 is connected to respective reactor in the border layer 26, 27 between the catalyst bed and the ceramic bed. Due to that fact an optimum purification is achieved also of the gas which is taken out form the apparatus via the conduits 22, 23.

The apparatus functions in the following way:

When starting the system the valve 19 close to the emission source 18 is closed at the same time as the bypass-valve 21 is kept open. The fan means 20 transports air via the conduit 17, the exchange valve 12 and the conduit 11 into the second reactor 2 (with the position the exchange valve 12 has in the drawing). The air passes the electric heaters 9 and 8 where it is heated and further through the catalyst bed 4 and the ceramic bed 6 of the first reactor 1.

In the ceramic bed 6 the heat of the air, which was absorbed from the electric heaters, is accumulated. After a counter-clockwise streaming in the apparatus during a certain time, the position of the exchange 12 is changed so that the air is allowed to stream in a clockwise direction, i.e. the air is allowed to pass the apparatus via the first reactor 1 and the second reactor 2. The air absorbs the accumulated heat amount in the first ceramic bed 6 which at the same time is cooled. Furthermore, the air gets a heat addition from the electric heaters. During the passage through the second reactor 2, the heat amount of the streaming air is emitted to the second ceramic bed 7 which is accordingly heated. Thus, the ceramic beds 6, 7 alternately function as heat absorbers and heat emitters.

As the alternate streaming continues, the temperature of the air increases. At a certain temperature the valve 19 close to the emission source is opened at the same time as the by pass-valve 21 is closed. This fact has the consequence that polluted gas from the emission source 18 is conducted into the purification apparatus and is allowed to stream through the purification apparatus comprising the reactors 1, 2. In this phase the streaming of the gas is made alternately in a counter-clockwise and a clockwise direction.

The catalytic combustion process starts at a temperature of about 300° C. In that connection hydrocarbons of the polluted gas are oxidized to carbon dioxide and water which can be let out to the atmosphere.

As has been mentioned previously, the combustion process is exothermic, i.e. energy is made free during the oxidation to carbon dioxide and water. This energy amount made free can be sufficient for maintaining a stable temperature in the apparatus. However, the energy amount made free increases with an increased degree of pollution of the gas, i.e. with an increased content of hydrocarbons in the gas. This fact can lead to severe material problems in the apparatus if the degree of pollution is high in the gas that shall be purified.

According to the invention the problem is solved by the fact that heat is deaerated via the conduit 22a alternatively 22b and the conduit 23 out to the atmosphere. This is made in that way that the temperature of the gas being purified is recognized in the upper portion of the apparatus. If the temperature exceeds a certain value, let us say 500° C., the valve 24 is opened during a counter-clockwise streaming (the valve 25 is closed), while the valve 25 is opened during a clockwise streaming (the valve 24 is closed). Due to that fact hot gas can stream out via the conduits 24a, b and 23 so that the temperature in the apparatus is kept on an acceptable level. Thanks to the fact that the conduits 22a, b have such a connection to the two reactors as has been mentioned previously, the gas is allowed to pass also the catalyst number 2 in the circulation system, before the gas is let out to the atmosphere via the conduits 22a, b and 23. Due to that fact also the deaerated gas becomes effectively purified.

Thus, this new apparatus functions effectively when purifying gases which are strongly polluted by hydrocarbons. The apparatus is also very suitable to be used when cleaning gases in which the content of hydrocarbons strongly varies.

The invention has been tested in several different plants and it has appeared that it functions very effectively. During one of the tests a report was made of the measurement of the degree of purification during purification of hydrocarbons (propane). In that connection the following measuring method was used:

FID-ANALYSATORJUM 3-300, calibrated to propane and nitrogene. The following result was received:

| Measuring point | Measured airflow | Measuring period | Average content of pollutions | Degree of purification | Temperature area |
|---|---|---|---|---|---|
| Intake air | 14.600 Nm³/h | 13,43 → 16,09 | 1619 ppm*⁾ | | |
| Exhaust air | 14.600 Nm³/h | 13,43 → 16,09 | 76,5 ppm*⁾ | 95,3% | |
| Deaeration ventilation | 4.500 Nm³/h | 13,43 → 16,09 | 76.5 ppm*⁾ | | 500– 450° C. |

*⁾1619 ppm corresponds to 3,52 g/Nm³.
76,5 ppm corresponds to 0,166 g/Nm³.

The maximum values of the degree of pollution were 3.500 ppm (7, 6 g/Nm³).

As appears from the table 4.500 Nm³/h were deaerated. This corresponds to a heating effect of 750 kW, which accordingly could be utilized for heating purposes.

As has been mentioned previously the energy amount made free increases with an increased degree of pollution in the gas. The deaerated heat energy amount, based on a heating effect of 750 kW according to the test, would accordingly correspond to an extra degree of pollution of approximately 5 g/Nm³. This means that the working area for a plant provided with the new invention can be enlarged from a degree of pollution of about 3 g/Nm³, which is valid for purification in conventional plants, to a degree of pollution of about 8 g/Nm³ without any deterioration of the degree of purification.

The invention is of course not limited to what has been described but can be modified within the scope of the following claims.

What is claimed is:

1. A method of purifying a gas polluted by hydrocarbons in an apparatus having two reactors, each reactor including a catalyst bed and a ceramic bed with a border layer therebetween, said method comprising the steps of:

alternately streaming said gas in a clock-wise direction through the first reactor and then through the second reactor, and streaming said gas in a counter clock-wise direction through the second reactor and then through the first reactor, wherein the hydrocarbons are oxidized to carbon dioxide and water as the hydrocarbons pass over the catalyst beds;

monitoring the temperature of said gas streaming through an upper portion of the reactors;

removing a portion of said gas streaming in the clockwise direction as said gas passes over the border layer lying between the catalyst bed and the corresponding ceramic bed of the second reactor when said gas exceeds a certain temperature; and removing a portion of said gas streaming in the counter clock-wise direction as said gas passes over the border layer lying between the catalyst bed and the corresponding ceramic bed of the first reactor when said gas exceeds a certain temperature.

2. An apparatus for purifying a gas polluted by hydrocarbons; said apparatus comprising:

two reactors positioned at a distance from one another;

pipe means connecting the two reactors together;

the first reactor including a first catalyst bed connected to a first ceramic bed;

a first border layer lying between the first catalyst bed and the first ceramic bed;

the second reactor including a second catalyst bed connected to a second ceramic bed;

a second border layer lying between the second catalyst bed and the second ceramic bed; and conduit means for venting said gas from each reactor to the atmosphere, the conduit means being connected to each reactor at the border layers so that said gas may be vented to the atmosphere from the border layer of each reactor.

3. The apparatus according to claim 2, wherein the conduit means comprises a plurality of conduits;

each conduit including at least two shut-off valves;

wherein one of the shut-off valves opens and closes the connection between the first reactor and the atmosphere and the other shut-off valve opens and closes the connection between the second reactor and the atmosphere; the shut-off valves being operated so that when one valve is open, the other valve is closed.

4. The apparatus according to claim 3, wherein the first conduit connects the two reactors together;

the first conduit being divided into two conduit portions;

the first conduit portion connecting the first reactor with the second conduit;

the second conduit portion connecting the second reactor with the second conduit; and one of the shut-off valves being located in the first conduit portion and the other shut-off valve being located in the second conduit portion.

5. The apparatus according to claim 4, wherein each reactor is vertically arranged so that each catalyst bed is located on top of each corresponding ceramic bed; and wherein each conduit portion connects to each reactor in the corresponding border layer.

* * * * *